United States Patent
Jao et al.

(10) Patent No.: US 9,353,461 B2
(45) Date of Patent: May 31, 2016

(54) FABRICATION OF NANOPOROUS MEMBRANE

(75) Inventors: Pitfee Jao, Gainesville, FL (US); Yong-Kyu Yoon, Gainesville, FL (US); Gloria Jung-a Kim, Gainesville, FL (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 231 days.

(21) Appl. No.: 14/116,403

(22) PCT Filed: May 10, 2012

(86) PCT No.: PCT/US2012/037323
§ 371 (c)(1),
(2), (4) Date: Dec. 27, 2013

(87) PCT Pub. No.: WO2012/158461
PCT Pub. Date: Nov. 22, 2012

(65) Prior Publication Data
US 2014/0124131 A1 May 8, 2014

Related U.S. Application Data

(60) Provisional application No. 61/485,716, filed on May 13, 2011.

(51) Int. Cl.
*B29C 65/74* (2006.01)
*B01D 67/00* (2006.01)
(Continued)

(52) U.S. Cl.
CPC .......... *D01D 5/0076* (2013.01); *B01D 67/0032* (2013.01); *B01D 71/44* (2013.01);
(Continued)

(58) Field of Classification Search
CPC .............. D01D 5/0092; D01D 5/0076; D01D 2323/39; D04H 1/728
See application file for complete search history.

(56) References Cited

U.S. PATENT DOCUMENTS 7,828,539 B1 * 11/2010 Beachley ............. D01D 5/0076
264/465
7,934,917 B2 5/2011 Chu et al.
(Continued)

FOREIGN PATENT DOCUMENTS

CN   WO 2010148644 A1 * 12/2010 ............. D01D 5/003
CN       2447396 A1 *  5/2012 ............. D01D 5/003
(Continued)

OTHER PUBLICATIONS

The International Preliminary Report on Patentability dated Nov. 28, 2013.
(Continued)

*Primary Examiner* — William Bell
(74) *Attorney, Agent, or Firm* — Thomas Horstemeyer. LLP

(57) ABSTRACT

Various methods and systems are provided for fabrication of nanoporous membranes. In one embodiment, among others, a system includes electrode pairs including substantially parallel electrodes, a controllable power supply to control the electrical potential of each of the electrode pairs, and a syringe to eject an electrically charged solution from a needle to form a nanofiber. The orientation of the nanofiber in a nanofiber layer is determined by the electrical potentials of the electrode pairs. In another embodiment, a method includes providing a nanoporous membrane including nanofiber layers between a transferor and a mainmold of a stamp-through-mold (STM) where adjacent nanofiber layers are approximately aligned in different directions. A patterned membrane is sheared from the nanoporous membrane using the transferor and the mainmold of the STM and transferred to a substrate.

20 Claims, 11 Drawing Sheets

(51) Int. Cl.
  *D01D 5/00* (2006.01)
  *B01D 71/44* (2006.01)
  *D04H 1/728* (2012.01)
  *D01F 9/08* (2006.01)

(52) U.S. Cl.
  CPC ......... *B29C65/7451* (2013.01); *B29C 65/7461* (2013.01); *D01D 5/0069* (2013.01); *D01F 9/08* (2013.01); *D04H 1/728* (2013.01); *B01D 2323/39* (2013.01); *Y10T 156/1062* (2015.01)

(56) References Cited

U.S. PATENT DOCUMENTS

| | | | | |
|---|---|---|---|---|
| 2002/0089094 | A1* | 7/2002 | Kleinmeyer | B82Y 30/00 264/465 |
| 2009/0233057 | A1 | 9/2009 | Aksay et al. | |
| 2011/0018174 | A1* | 1/2011 | Baca | D01D 5/0092 264/465 |
| 2012/0244291 | A1* | 9/2012 | Bisht | D01D 5/0092 427/458 |

FOREIGN PATENT DOCUMENTS

| | | | |
|---|---|---|---|
| JP | 2008-274487 A | 11/2008 | |
| KR | 10-0687786 B1 | 2/2007 | |
| NL | WO 2006112697 A1 * | 10/2006 | ........... D01D 5/0092 |

OTHER PUBLICATIONS

J. Doshi et al., "Electrospinning Process and Applications of Electrospun Fibers," Journal of Electrostatics, vol. 35, pp. 151-160, Aug. 1995.

P.F. Jao et al., "Spatially Controlled Electrospun Solid Gradient Nanofibers for Guided Spiral Ganglion Neuron Culture," Biomedical Engineering Society 2010 Annual Meeting, Austin, TX, Oct. 2010.

C. S. Kong et al., "Nano-web formation by the electrospinning at various electric fields," Journal of Material Science, vol. 42, pp. 8106-8112, Oct. 2007.

D. Li et al., "Electrospinning nanofibers as uniaxially aligned arrays and layer-by-layer stacked films," Advanced Materials, vol. 16, No. 4, pp. 361-366, Feb. 2004.

H. Lee et al., "Highly oriented electrospun polycaprolactone micro/nanofibers prepared by a field-controllable electrode and rotating collector," Applied Physics A, vol. 97, No. 3, pp. 559-565, Nov. 2009.

C. Chang et al., "Continuous near-field electrospinning large area deposition of orderly nanofiber patterns," Applied Physics Letters, vol. 93, No. 12, Sep. 2008.

H. G. Sundararaghavan et al., "Electrospun Fibrous Scaffolds with Multiscale and Photopatterned Porosity," Macromolecule Bioscience, vol. 10, No. 3, pp. 265-270, Mar. 2010.

G.H. Kim et al., "Carbon Nanotube Embedded Three Dimensional (3-D) Carbon Microelectrodes for Rechargeable Microbatteries," American Vaccum Society 56th International Symposium & Exhibition, Nov. 2009.

Z. Fan et al., "Wafer-Scale Assembly of Highly Ordered Semiconductor Nanowire Arrays by Contact Printing," Nano Letters, vol. 8, pp. 20-25, Aug. 2007.

C.I. Asemota et al., "Micropatterned Polythiophene Nanofibers via Electrostatic Spinning and Photolithography," Materials Research Society Symposium Proceedings, vol. 948, pp. 24-28, Nov. 2006.

J. Liu et al., "Parametric optimization of micro-contact printing based thermal transfer of electrospun nanofibers," Microelectronic Engineering, vol. 87, Issue 12, Dec. 2010, pp. 2513-2517.

P. Jao et al., "Fabrication of nanoporous membrane and its nonlithographic patterning using Electrospinning and Stamp-thru-mold (ESTM)," IEEE 24th International Conference on Micro Electro Mechanical Systems (MEMS), pp. 257-260, Jan. 2011.

H. Onoe et al., "Living Cell Fabric," IEEE 24th International Conference on Micro Electro Mechanical Systems (MEMS), pp. 908-911, Jan. 2011.

R. Tane et al., "Multi-layer Signal Encoded Tissue Culture Device formed of Nano-Fibrous Microcapsules," IEEE 24th International Conference on Micro Electro Mechanical Systems (MEMS), pp. 1047-1050, Jan. 2011.

H. Borteh et al., "Porous microfluidics: A unique platform for transvascular study," IEEE 24th International Conference on Micro Electro Mechanical Systems (MEMS), pp. 952-955, Jan. 2011.

The International Search Report and Written Opinion dated Dec. 21, 2012.

* cited by examiner

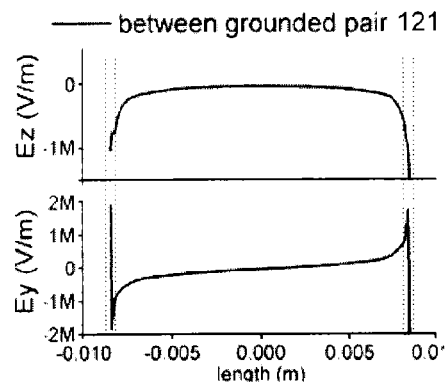
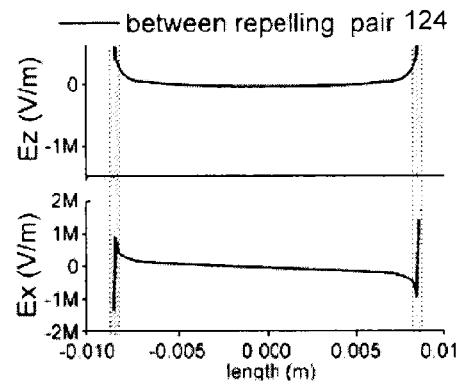
FIG. 2B          FIG. 2C
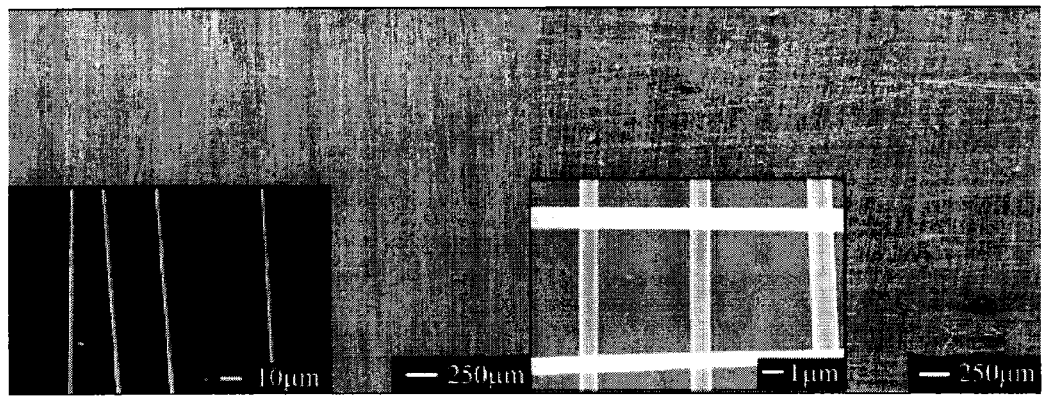
FIG. 3A          FIG. 3B

FABRICATION OF NANOPOROUS MEMBRANE

CROSS-REFERENCE TO RELATED APPLICATION(S)

This application is the 35 U.S.C. §371 national stage of PCT application PCT/US2012/037323, filed May 10, 2012, which claims priority to and the benefit of U.S. Provisional Application Ser. No. 61/485,715, filed May 13, 2011, both of which are hereby incorporated by reference herein in their entirety.

STATEMENT REGARDING FEDERALLY SPONSORED RESEARCH OR DEVELOPMENT

This invention was made with government support under agreement ECCS 1132413 awarded by the National Science Foundation. The Government has certain rights in the invention.

BACKGROUND

Nanoporous membrane is a component used in many concurrent electronics, biomedical, and chemical applications such as electrochemical storage devices, biomedical immunoassay systems, cell culture scaffolds, tissue engineering constructs, and nanoparticle separation, etc. Both organic and inorganic membranes may be utilized for those applications.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2C are graphical representations of examples of an electric field distribution for the ESTM system of FIGS. 1A, 1C, 1D and 9 in accordance with various embodiments of the current disclosure.

FIGS. 3A-3D are scanning electron micrographs (SEMs) of examples of nanofiber layers formed with the ESTM system of FIGS. 1A, 1C, 1D and 9 in accordance with various embodiments of the current disclosure.

DETAILED DESCRIPTION

Figure 1A:
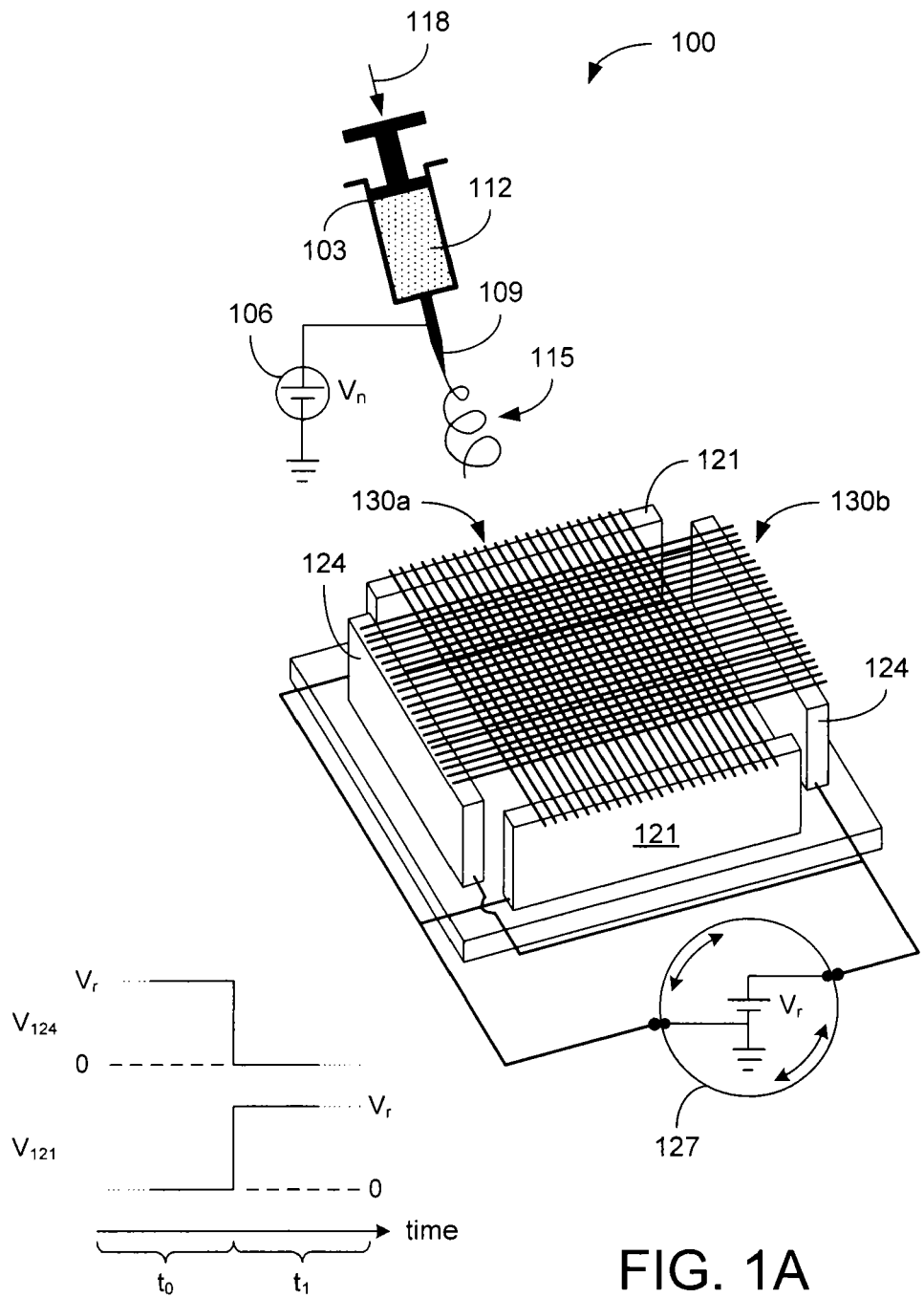
FIGS. 1A, 1C, 1D and 9 are graphical representations of examples of an electrospinning and stamp-thru-mold (ESTM) system in accordance with various embodiments of the present disclosure.

Disclosed herein are various embodiments of methods and systems related to fabrication of nanoporous membrane. Reference will now be made in detail to the description of the embodiments as illustrated in the drawings, wherein like reference numbers indicate like parts throughout the several views.

Biocompatible nanoporous membrane, when used as a tissue scaffold, offers numerous advantages for cell culturing and manipulation. The topographically matched nanodimension with some cells and neurons promotes their adhesion and survivability, the three-dimensionality of a multistacked membrane provides pseudo in vivo environment, and the controllability of mechanical properties and vascularization with different porosity offers a versatile platform.

Electrospinning is a technique that can be used to produce a large number of nano size diameter fibers in macro lengths. The ability to produce mesoscale areas of nanoscale structures and the ability to encapsulate functional nanomaterials inside electrospun fibers make it a versatile technique to fabricate tissue scaffolds. The standard electrospinning technique subjects a polymer solution to high voltages squeezed through a nozzle that is collected on a grounded plate at an appropriate distance to produce nanofibers. Electrospun nanofibers can be aligned using various techniques broadly classified as an electric field scheme, a mechanically moving collector scheme, and a direct writing scheme. Layers of aligned nanofibers can form a nanoporous membrane. Micropatterning of such nanofiber membranes has applications in various areas such as, but not limited to, providing a three-dimensional environment for cell culture, high density electrodes in battery applications, or patterned Si—Ge nanowires for high mobility diodes/transistors.

A combined electrospinning and stamp-thru-mold (ESTM) technique may be utilized as a cost-effective, efficient, and non-lithographic pattern transfer process of electrospun nanofibers. Nanoporous membranes are prepared using an electrospinning setup to align nanofibers and stack up in situ self-aligned multiple layers of orthogonally aligned nanofibers. Analysis of electrospun nanofiber alignment associated with an electric field map may be performed using a COMSOL Multiphysics® simulation software. The nanofiber membrane is then mechanically sheared between a pair of patterned micromolds, stamping thru the patterned nanofibers onto an underlying substrate. ESTM may be performed using, e.g., poly-lactic-co-glycolic acid (PLGA) to form a biodegradable nanoporous membrane. The biocompatibility of the fabricated membrane can be verified in vitro.

Referring to FIG. 1A, shown is a graphical representation of an electrospinning system 100 illustrating the sequential electrospinning of layer by layer of orthogonally aligned nanofibers. The electrospinning system 100 includes at least one syringe 103 and a power supply 106 connected to the needle 109 of the syringe 103. An electrospun solution 112 in the syringe 103 is positively charged ($V_n$) by the power supply 106, which may provide a needle voltage ($V_n$) as high as, e.g., 30 kV. Nanofibers 115 are formed by ejecting the positively charged electrospun solution 112 through the needle 109 of the syringe 103. The syringe 103 may be driven by a syringe pump 118. The electrospinning system 100 may also include a grounded cathode plate, which may be mounted on a xyz-stage to adjust and/or control the electric field. In some embodiments, the electrospinning system 100 may be inside a chamber (e.g., an acrylic box) with a ventilation connection to minimize environmental air flow effects and maintain consistent chamber pressure during the process.

The electrospinning system 100 also includes multiple pairs of substantially parallel electrodes for orientation of the nanofibers. For example, in the embodiment of FIG. 1A, the electrospinning system 100 includes two pairs of orthogonally aligned electrodes 121 and 124 separated with a gap. Each of the electrode pairs are connected to a controllable power supply 127 configured to control the potential applied to the connected electrode pairs. In the embodiment of FIG. 1A, the controllable power supply 127 is a reversible power supply connected to electrode pairs 121 and 124. In some embodiments, additional pairs of electrodes may be utilized to produce nanofiber layers with different orientations. For example, three pairs of electrodes may be positioned in a hexagon pattern and controlled to produce nanofiber layers with different orientations.

In the example depicted in FIG. 1A, the first pair of electrodes 121 is grounded while the second pair of electrodes 124 is maintained at a low repulsion voltage ($V_r$) during a first time period $t_0$. In this configuration, nanofibers 115 ejected from the needle 109 will be aligned perpendicular to the first pair of electrodes 121, while the potential applied to the second pair of electrodes 124 repels any nanofibers in its orientation. Thus, a layer of ordered or aligned nanofibers 130a is formed during the first time period $t_0$. At the beginning of the next time period $t_1$, the reversible power supply 127 switches the potentials applied to the electrode pairs 121 and 124, so that the first pair of electrodes 121 is maintained at $V_r$ and the second pair of electrodes 124 is grounded. In this reversed configuration, the nanofibers 115 ejected from the needle 109 are aligned in a direction that is approximately orthogonal to those deposited during the first time period $t_0$, forming another layer of ordered or aligned nanofibers 130b disposed on the prior layer of aligned nanofibers 130a. FIG. 1A includes a plot illustrating the potential ($V_{121}$) of the first pair of electrodes 121 and the potential ($V_{124}$) of the second pair of electrodes 124 with respect to time periods $t_0$ and $t_1$.

Figure 1B:
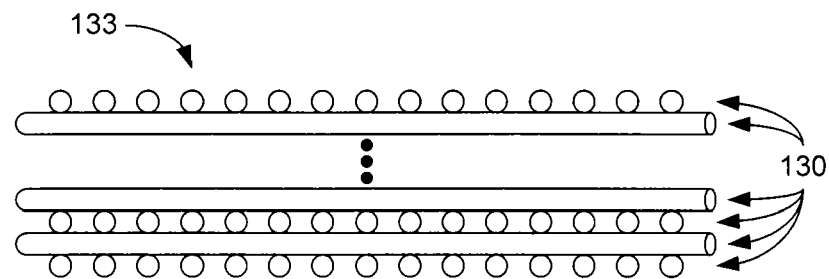
FIG. 1B is a graphical representation of an example of a nanoporous membrane in accordance with various embodiments of the present disclosure.

Continuing to alternate the potentials of the electrode pairs 121 and 124 by the reversible power supply 127 can produce a nanoporous membrane including a plurality of aligned nanofiber layers 130 with the nanofiber alignment of adjacent layers being approximately orthogonal to each other. FIG. 1B is a graphical representation illustrating a cross-sectional view of a nanoporous membrane 133 including a plurality of orthogonally aligned nanofiber layers 130. With subsequent layering, the gaps between the aligned fibers 130 can be reduced to nanoscales in the nanoporous membrane 133. Aligned or ordered nanofibers may also be obtained from the electrospinning process by adopting differently shaped collector electrodes, adjusting the mechanical movement of the collector electrodes, and introducing additional control electrodes. In some embodiments, the patterned membranes can be formed with both aligned and random nanofibers. For example, a layer may be included that comprises nanofibers with random orientations.

The nanoporous membrane 133 may also comprise a variety of materials, such as different kinds of polymers, a composite of polymer and ceramic precursor, carbon, and ceramic. Stacking multiple layers with different functional polymers can improve multiplexed biosensing and analysis. Polymeric or polymer/ceramic composite nanoporous membranes can be formed by electrospinning. Carbon and ceramic nanoporous membranes can be produced by applying an additional thermal process after the electrospun nanofibers are formed. The precursor polymer can be transformed to carbon by pyrolysis (i.e., thermal carbonization) in a high temperature furnace in an inert environment (e.g., $N_2$), where the overall volume shrinks due to mass loss. If this process is performed in an oxygen ($O_2$) environment, even carbon will vanish as carbon dioxide gas leaving nothing behind. When a composite of polymer and ceramic precursor is sintered in a high temperature furnace in an oxygen ($O_2$) environment, the ceramic material remains, also accompanied by a volume shrinkage. The significance of this approach is its convenience and easiness of generating patterned carbon or ceramic nanoporous membranes, which otherwise require more expensive and harsh processes to produce.

Figure 1C:
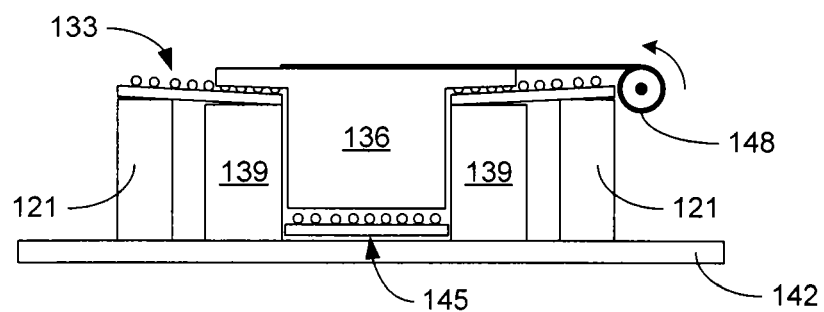

Referring next to FIG. 1C, shown is a cross-sectional view illustrating of non-lithographic patterning of the nanoporous membrane 133 using a stamp-thru-mold (STM) process. The nanoporous membrane 133 is placed between a pair of micromolds, e.g., a transferor 136 and a mainmold 139, and mechanically sheared, broken and transferred onto a substrate 142 below the pair of molds 136 and 139 to form a patterned membrane 145. In the embodiment of FIG. 1C, the transferor 136 is rotated by a motor 148 to shear the nanoporous membrane 133. In some implementations, magnetic forces may be used to shear the nanoporous membrane 133. For example, magnets positioned on the back side of the transferor 136 and the opposite side of the substrate 142 may be used to generate the force needed to shear the nanoporous membrane 133. In some embodiments, the mainmold 139 is positioned between the electrode pairs 121 and 124 and the nonporous membrane 133 is formed directly over the mainmold 139. Mechanically shearing the nonporous membrane 133 with a STM eliminates the chance of chemical contaminations and dissolution so that the nanofibers are chemically and biologically unaltered. Adhesion of the patterned membrane 145 to the substrate 142 allows the patterned membrane 145 to be separated from the transferor 136. Some or all of the ESTM process may be computer controlled.

The use of microscale mold designs can greatly increase the resolution and scalability of the ESTM technique. In addition, intricate pattern designs can be employed and replicated with great fidelity. Repeated user of the mold design can reduce fabrication cost compared to a photolithography approach. For example, the molds 136 and 139 may be a pair of interdigitated or interlocking comb patterns with dimensions ranging from about 2 mm to about 50 μm. The comb patterns may be fabricated using photopatternable epoxy SU-8 with UV lithography and a sacrificial lift-off procedure. Other patterns may also be utilized as can be understood. Adhesion of the patterned membrane 145 to the substrate 142 allows it to be transferred regardless of their material, shape, and orientation.

Figure 1D:
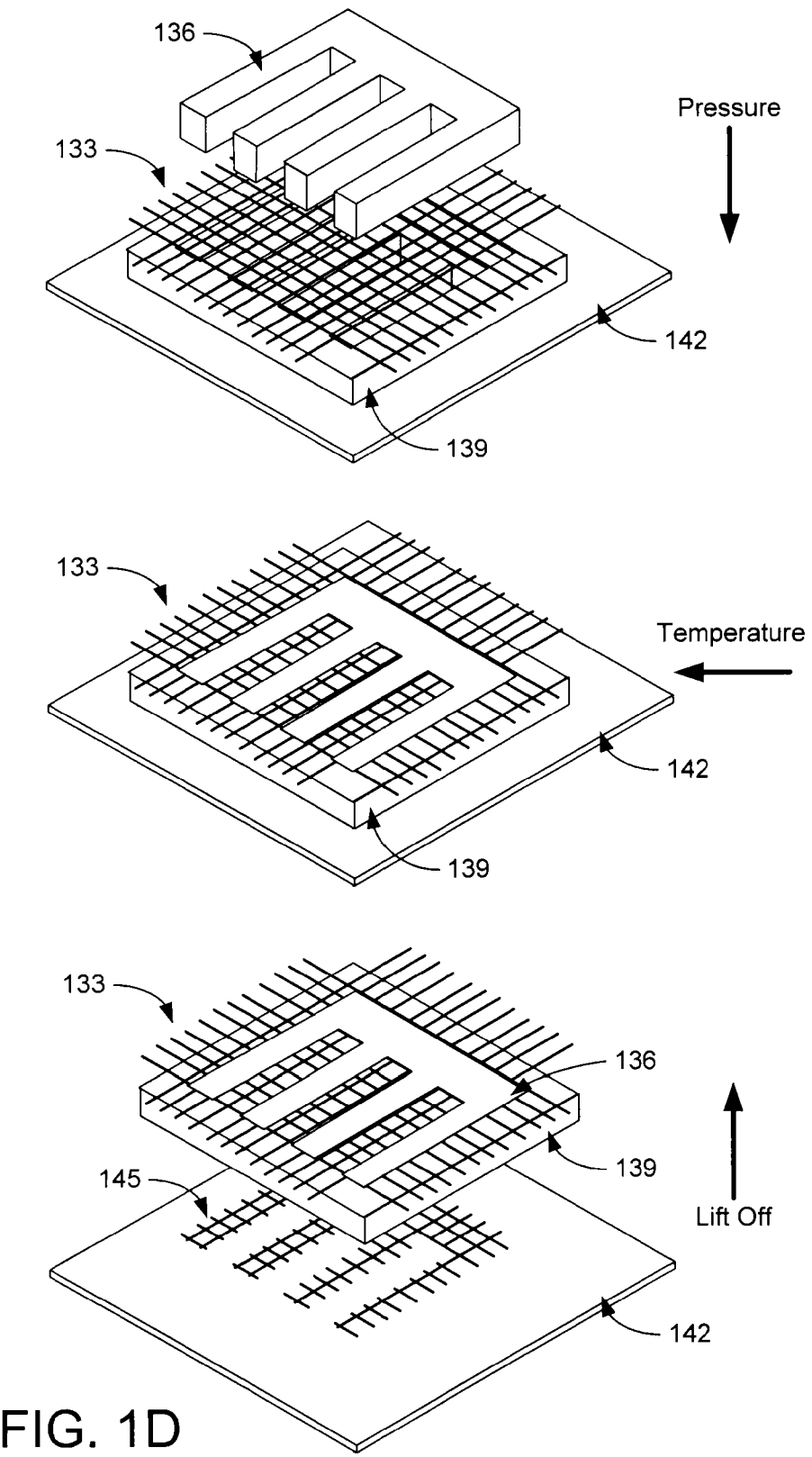

FIG. 1D illustrates the non-lithographic patterning of the nanoporous membrane 133 using a stamp-thru-mold (STM) process. With the nanoporous membrane 133 placed between the transferor 136 and the mainmold 139, pressure is applied to the transferor 136 to shear and transfer the patterned membrane 145 onto an underlying substrate 142. The pressure may then be maintained while an increased temperature is applied to the patterned membrane 145. For example, the stamping may be performed at a pressure of about 6.25 kPa and a temperature of about 150° C. for a period of about 20 minutes. The transferor 136 and mainmold 139 may then be lifted off to separate the patterned membrane 145 from the excess nanoporous membrane 133.

Figure 2A:
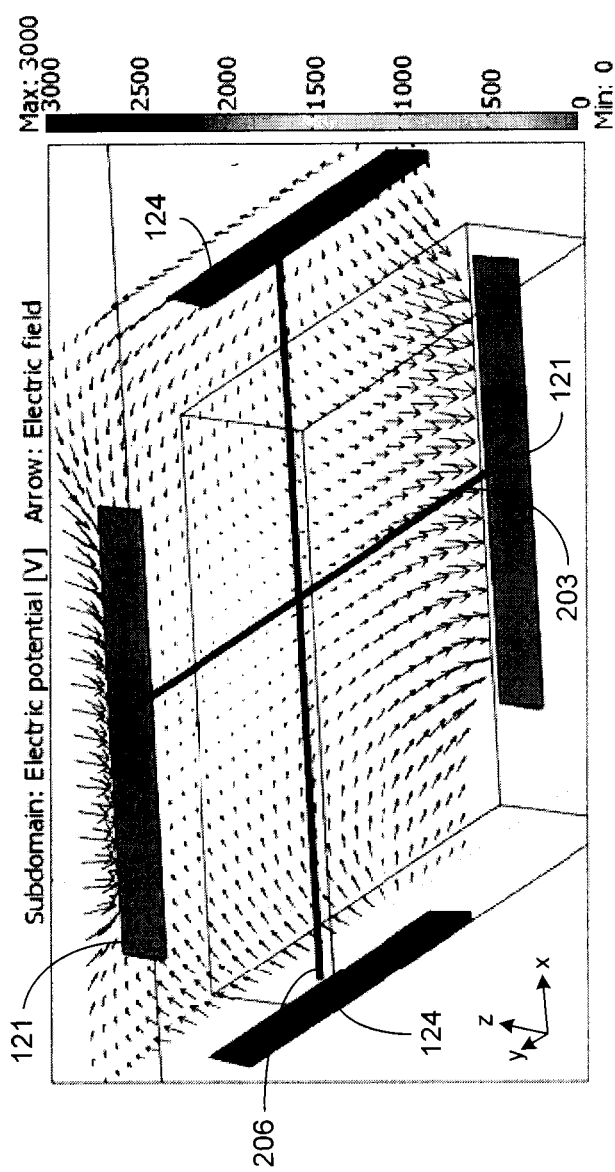

Referring now to FIG. 2A, shown is an example of an electric field distribution for the electrospinning system 100 depicted in FIG. 1A in accordance with various embodiments of the current disclosure. The alignment of the nanofibers in a nanofiber layer 130 is determined by the electrostatic charge induced at the grounded electrodes 121 due to the charged nanofibers 115. The alignment of nanofibers in 3D can be explained thoroughly by resolving the electric fields near the grounded electrodes 121. In order to have better in-plane (spatial) electric field controllability in the collector side, an additional potential $V_r$ is provided. In FIG. 1A, $V_n$ determines the electric field effect at the global level, which provides the main electrostatic force causing electrospinning and governs the macro direction of the nanofibers 115, while $V_r$ determines the local electric field effect occurring at the electrode pairs 121 and 124, which helps the spatial field confinement. In order to see the electric field distribution around the grounded electrodes 121, electric field simulations of the electrode setup were performed using the COMSOL Multiphysics® simulation package (COMSOL Inc.). FIG. 2A shows the simulated 3D electric field vectors at the electrode pair junction. The electric flux lines point towards the grounded electrode pair 121, while pointing away from the repulsion electrode pair 124; which helps the final orientation of the nanofiber alignment. When the potentials on the electrode pairs 121 and 124 are alternated, the electric field is realigned accordingly.

Further quantitative analysis of the varied electric field strength along the reference lines 203 and 206 perpendicular to the electrode pairs 121 and 124 is shown in FIGS. 2B and 2C, respectively. The electric field strength is resolved into 3 components $E_x$, $E_y$ and $E_z$ along the x, y and z axes. $E_z$ shows the maximum electric field at the electrode junctions and its direction is determined by the electric potential at the electrodes. $E_y$ and $E_x$ on the other hand, determine the in-plane spatial distribution of electric field that determines the spatial alignment of fibers. The spatial electrostatic force along the length of the grounded electrodes 121 gives the necessary elongation for stretching the nanofibers 115.

The electrospinning and stamp-thru-mold (ESTM) technique is a fabrication process which includes the versatility of the electrospinning process for nanofiber fabrication with the non-lithographic patterning ability of the stamp-thru-mold process. The ESTM process can produce a multilayer nanoporous membrane with a thickness from a few tens of nanometers to a few hundreds of micrometers or thicker and a pattern size from a few micrometers to a few centimeters or greater. In-situ multilayer stacking of orthogonally aligned nanofibers can produce a nanoporous membrane using orthogonally placed collector electrode pairs and an alternating bias scheme. The pore size of the nanoporous membrane can be controlled by the number of layers and the deposition time of each layer. The membrane materials encompass various polymers such as, but not limited to, biocompatible, biodegradable, and photosensitive polymers; nanomeshed carbon material after the pyrolysis of electrospun polymeric nanofibers; and nanoporous inorganic materials after sintering the electrospun composite nanofibers of polymers and inorganic precursors. In some implementations, individual layers of aligned nanofibers may vary to provide functionality and customization.

Non-lithographic patterning of the fabricated nanoporous membrane may then be performed by mechanical shearing using a pair of pre-fabricated micromolds. This patterning process is contamination free compared to other photo lithographical patterning approaches. The patterning may be employed using different substrates with and without oxygen plasma surface treatment. In vitro tests of ESTM poly-lactic-co-glycolic acid (PLGA) nanofibers verify the biocompatibility of this process.

EXPERIMENTAL RESULTS

Polyvinylpyrrolidone (PVP) 8 wt % polymer solutions 112 (FIG. 1A) were prepared in Isopropyl alcohol (IPA) and loaded into a standard syringe 103 (FIG. 1A) with a 22G blunt tip dispensing needle 109 (FIG. 1A). The needle 109 was connected with a high voltage supply 106 of FIG. 1A (Spellman HV Elec. Grp, N.Y.). The electrospinning voltage (Vn) was 12.5 kV and the needle tip and collector distance (TCD) was 15 cm. A repulsion voltage (Vr) of 3 kV was supplied with a high voltage supply 127 of FIG. 1A (Power Designs Inc., N.Y.). The solution 112 flowed at 2 µl/min via a syringe pump 118 of FIG. 1A (New Era Pump System Inc., N.Y.).

Figures 3C, 3D:
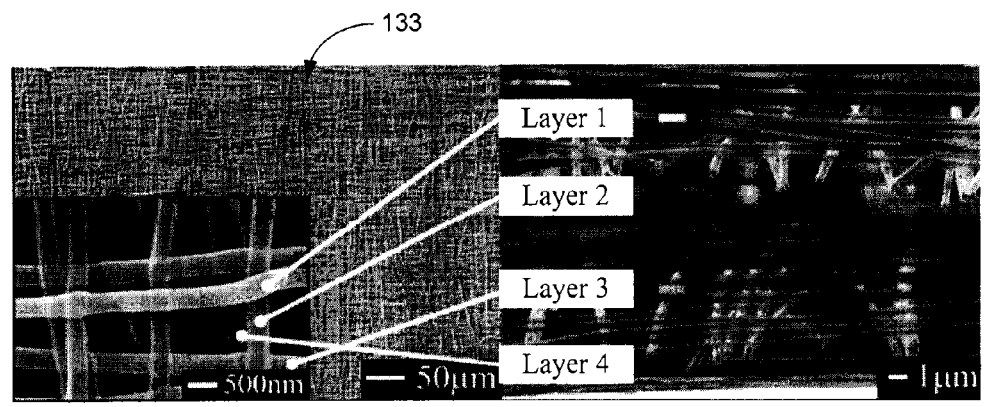

Referring to FIGS. 3A and 3B, shown are scanning electron micrographs (SEM) of uniaxially aligned and orthogonally aligned nanofibers, respectively, using the two-pair electrode setup of FIG. 1A. As illustrated in FIGS. 3A and 3B, the deposited nanofibers exhibit approximately uniaxial and orthogonal alignments. To decrease the pore size of the electrospun nanofiber membrane 133 (FIG. 1B), multiple layers 130 (FIG. 1B) of orthogonally aligned fibers can be sequentially layered on top of each other to give a denser membrane with smaller pores. FIG. 3C shows a SEM view of a fabricated nanoporous membrane 133 including ten nanofiber layers. The inset of FIG. 3C and FIG. 3D show top and cross-sectional views, respectively, of at least four layers of orthogonally aligned nanofibers included in the fabricated nanoporous membrane of FIG. 3C.

Figures 4A, 4B, 4C:
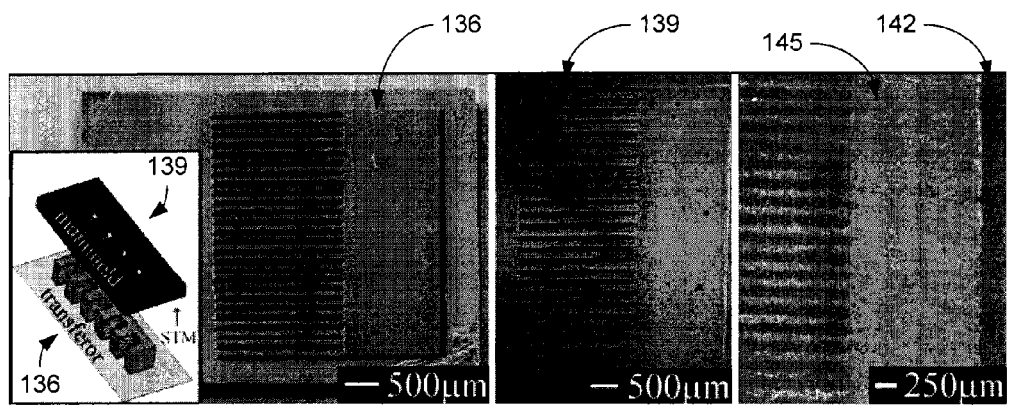
FIGS. 4A-4D are SEMs of examples of a transferor and a mainmold of the ESTM system of FIGS. 1A, 1C, 1D and 9 in accordance with various embodiments of the current disclosure.

The micromolds used in the STM process were fabricated in SU8 2025 (Microchem, Mass.) using a conventional UV lithography and sacrificial layer process. In the embodiment of FIGS. 4A-4C, the transferor 136 and mainmold 139 were fabricated with an interdigitated finger pattern. FIG. 4A is a 45° SEM showing the interdigitated finger patterns of the transferor 136. FIG. 4B shows the nanoporous membrane overlaying the mainmold 139. The nanoporous membrane 133 (FIG. 1C) may be transferred onto the mainmold 139 or may be formed directly over the mainmold 139. The transferor 136 is then stamped through the mainmold 139, shearing and transferring the patterned membrane 145 (FIG. 1C) onto an underlying silicon substrate 142 (FIG. 1C). The stamping may be performed at a pressure of about 6.25 kPa, a temperature of about 150° C. and held together for about 20 minutes. The gap between the mainmold 139 and transferor 136 is about 25 µm at the fingers. Upon separation, the mainmold 139 is held to the transferor 136 with sandwiched nanofibers. The patterned nanofibers are stamped on the substrate 142. FIG. 4C shows the patterned membrane 145 on the silicon substrate 142. The patterned membrane 145 may then be separated from the substrate 142 for use. In some implementations, the substrate 142 may be heated by a heat source such as, e.g., an integrated heater, a hot plate, or a separate heater. For example, heating the patterned membrane 145 can improve bonding between the nanofiber layers. Pressure may be applied by the transferor to aid in annealing the layers. In some implementations, a heater may be included in the transferor 136 as well.

Figure 4D:
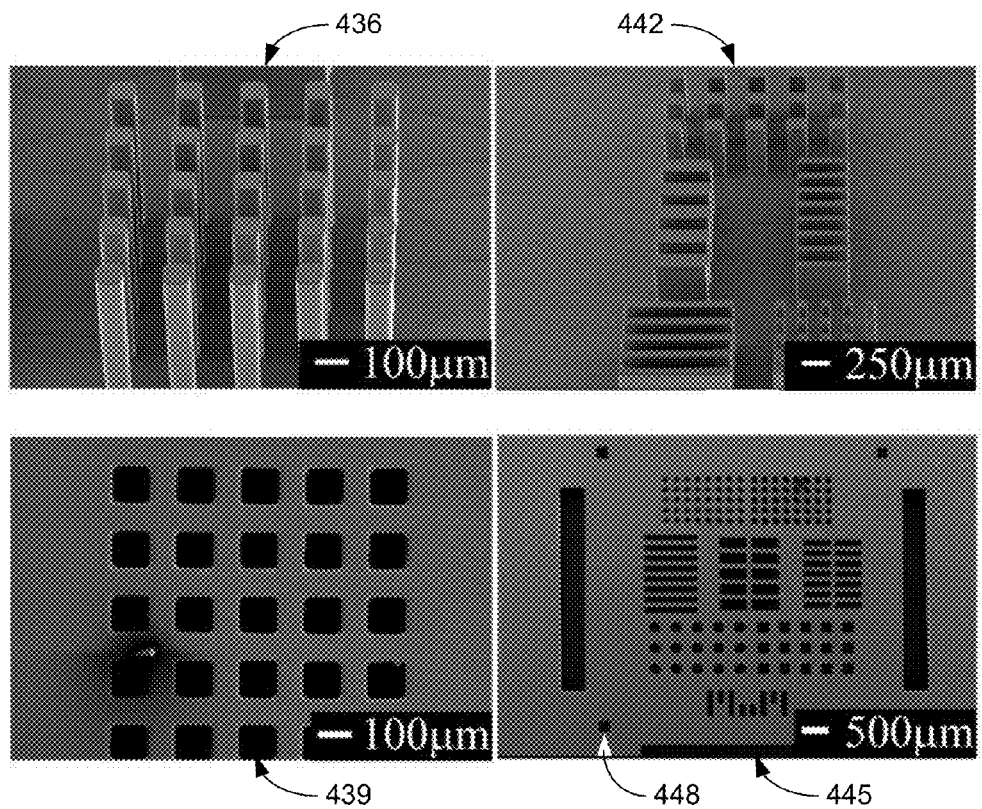

More complicated molds may also be utilized for patterning of the nanoporous membrane 133. FIG. 4D illustrates various patterns of microfabricated molds that may be used. For example, mold patterns may include pillar arrays such as a transferor 436 having 5×5 square pillar array with a side length of each square of 75 μm and a mainmold 439 having a corresponding 5×5 square hole array with a side length of 125 μm to match the transferor pattern. Other transferors 136 may include various combinations of pillar sizes and/or layouts as shown by 442. Similarly, other mainmolds 139 may include a variety of hole patterns as shown by 445 with, e.g., 20 μm holes for mold release and to diminish stress. Guide holes 448 may be included in transferors 136 and/or mainmolds 139 to aid in alignment during formation of the patterned membrane 145.

Figures 5A, 5B:
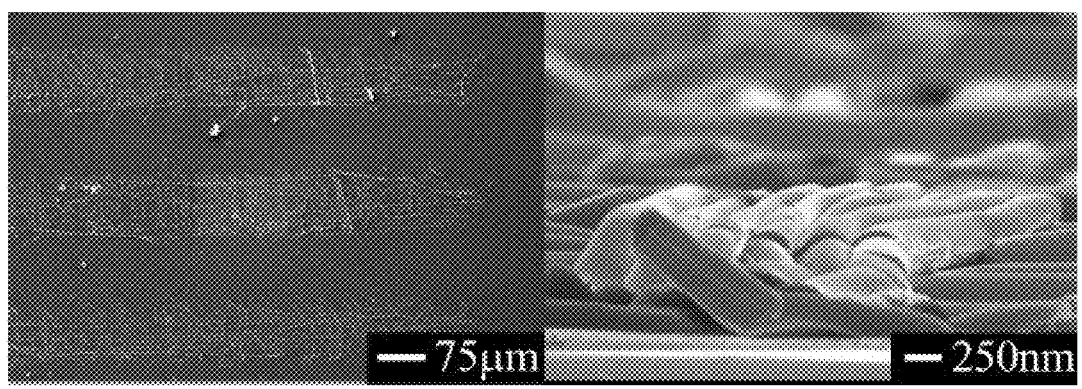
FIGS. 5A-5F are SEMs of examples of patterned membranes produced with the ESTM system of FIGS. 1A, 1C, 1D and 9 in accordance with various embodiments of the current disclosure.
Figures 5C, 5D:
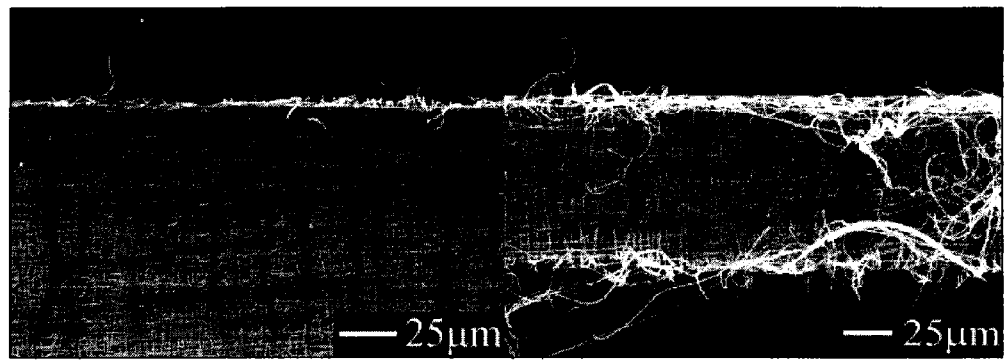
Figures 5E, 5F:
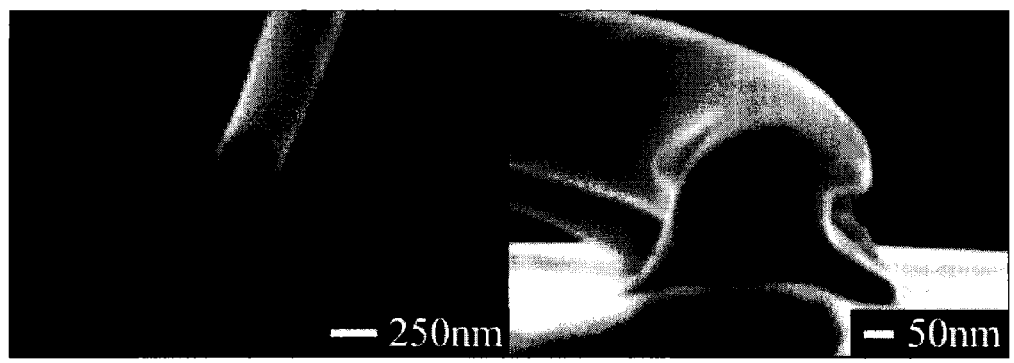

Referring to FIGS. 5A-5F, the ESTM process was used to produce patterned membranes 145 from a membrane including multiple layers of orthogonally aligned nanofibers. FIG. 5A shows the fingers patterns of a 2-layer membrane with distinctive edges. FIG. 5B shows the cross-section of the 2 layer membrane that shows the separation of layers even after STM. FIGS. 5C and 5D show the edge and finger patterns, respectively, of a 10 layer membrane. The micromolds were designed to give 87.5+/−12.5 μm finger widths. The average measured width was 95.4 μm for the two-layer patterned membrane 145 and 91 μm for the ten-layer patterned membrane 145. FIGS. 5E and 5F show the deformation experienced in the cross-section of the nanofiber following the STM step. This is due to the process pressure and temperature, which were close to the glass transition temperature (PVP Tg=110-180° C.) used in the STM process. Under these pressure and temperature conditions, the nanofiber layers are effectively annealed. In this way, the STM process provides a robust adhesion between the layers. This is in stark contrast with microcontact printing, where the layers are held together by weaker forces.

Figure 6:
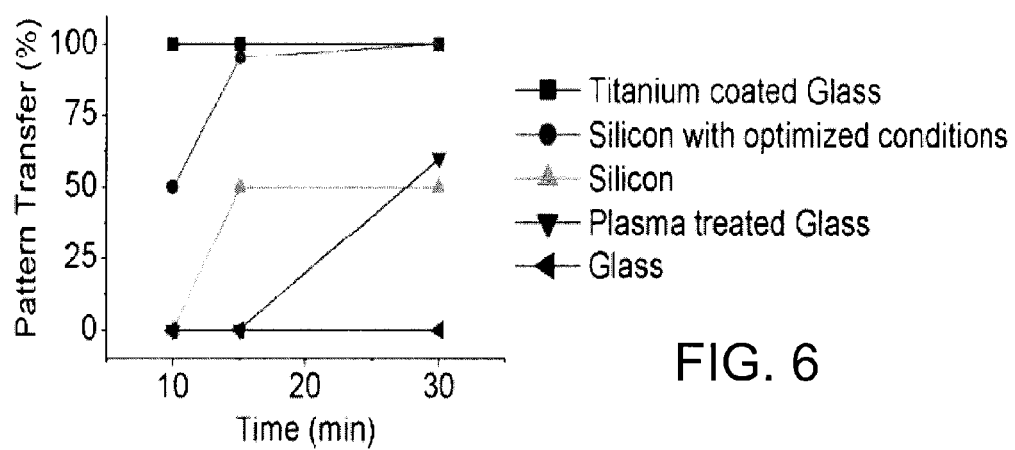
FIG. 6 is a plot illustrating the transfer effects of the ESTM system of FIGS. 1A, 1C, 1D and 9 on PVP nanofibers with different substrates in accordance with various embodiments of the current disclosure.

Referring next to FIG. 6, shown is a plot representing the effects of ESTM on PVP nanofibers with different substrates. The best adhesion conditions of ESTM patterns were observed with titanium coated glass substrates and the least adhesion was observed with pure glass, while plasma treated glass showed improved conditions with longer stamping times. As can be seen in FIG. 6, increased stamping time improved adhesion on silicon, but enhanced adhesion was further observed with an increase in time and temperature. Stamping pressure was maintained at 6.25 kPA in all cases.

ESTM can also be used with biocompatible polymers such as PLGA. For example, growth factor neurotrophin (NT 3) encapsulated in PLGA polymer nanofiber membranes were used as tissue scaffolds for the guided culture of rat spiral ganglion neurons (SGN). The directional growth of SGNs on the PLGA nanofiber illustrated the biocompatible nature of the technique.

Figure 7:
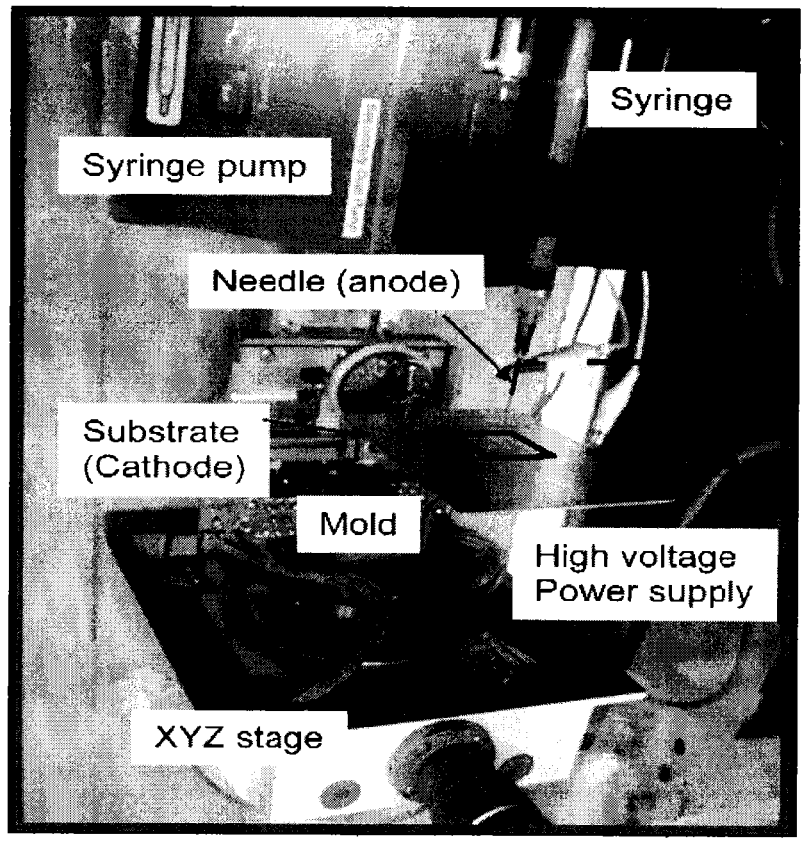
FIG. 7 is a picture of an ESTM system of FIGS. 1A, 1C, 1D and 9 in accordance with various embodiments of the current disclosure.
Figure 8:
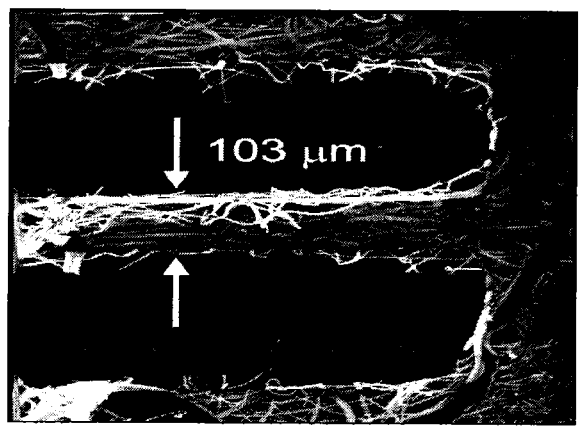
FIG. 8 is a SEM illustrating an example of a patterned membrane on a substrate after completing the pattern transfer with the ESTM system of FIGS. 1C, 1D and 9 in accordance with various embodiments of the current disclosure.

In another implementation, nanofibers 115 (FIG. 1A) were electrospun on a micromold with interlocking comb patterns with dimensions ranging from 2 mm to 50 μm. The comb patterns are fabricated using photopatternable epoxy SU-8 with UV lithography and sacrificial lift-off procedure. For the electrospun polymer solution, 36% (w/v) poly (L-lactic-co-glycolic) acid (PLGA) in acetone solution was used. A high voltage power supply 106 of FIG. 1A (603C-30OP, Spellman High Voltage Electronics Colo.) configured to provide up to 30 kV was connected to a syringe needle 109 (FIG. 1A) providing a voltage up to 30 kV, by which polymer solution 112 (FIG. 1A) is positively charged. The syringe 109 is driven by a syringe pump 118 of FIG. 1A (NE 1000, New Era Pump System Inc.). A cathode plate connected to the power supply 106 is placed on a xyz-stage to precisely control the electric field. The electric field strength was maintained at 5 kV/cm and the volume discharge rate was 0.058 ml/min. FIG. 7 is a picture of the electrospinning system. The whole system is placed inside an acrylic box with a ventilation connection to minimize environmental air flow effects and maintain consistent chamber pressure during the process. After formation of the nanoporous membrane 133 (FIG. 1C), the patterned membrane 145 (FIG. 1C) is sheared and transferred to the substrate 142 (FIG. 1C). FIG. 8 shows an example of a resultant patterned membrane 145 (FIG. 1C) on a titanium coated glass substrate 142 after completing the pattern transfer. Nanoporous membranes 133 formed of PLGA nanofibers have been stamped on different substrates with varying transfer results.

Ferroelectric nanoporous membranes and multiplexing nanoporous membranes may be produced. A ferroelectric nanoporous membrane may comprise directional ferroelectric nanofibers formed using the ESTM and exposed to a post sintering process. For example, bismuth layer-structured ferroelectrics (BLSFs) exhibit high dielectric constant materials with attractive properties such as environmentally friendly lead-free composition and fatigue free characteristic. Especially, the La-substituted Bismuth Titanate (Bi3.25La0.75Ti3O12:BLT) shows excellent ferroelectric, crystalline properties and may be promising dielectric for capacitors and memory devices. BLT nanofiber synthesis may be performed using electrospinning and subsequent sintering. For example, a composite solution including a metal-organic decomposition (MOD) solution of BLT and a binder of poly(vinylpyrrolidone) (PVP) may be electrospun in an electric field of about $3 \times 10^5$ V/m to form nanofiber with a diameter of 300 nm. The resulting BLT/PVP composite nanoporous membrane may be sintered in air for 1 hour at 500, 600, 700, 750, and 800° C., respectively.

For a multiplexing nanoporous membrane application, large-area thin layers are stacked on top of each other to yield a thick multilayered membrane. Each individual layer can be functionalized and customized to, e.g., probe a characteristic of a protein, such as size, length, shape and concentration, allowing the construction of a high-throughput multiplexed sensor. For example, a polymeric membrane, or a carbon membrane can be chosen as a platform for the sensor. The functionalization strategy for the respective layer depends on the analyte (protein), the membrane material and pore size of the membrane. One functionalization scheme is uniformly applied to a single layer to assess specificity. Then, a multi-layer sensor is constructed to test high throughput capability. To enable multiplexing, differently functionalized layers can be integrated into the nanoporous membrane.

Figure 9:
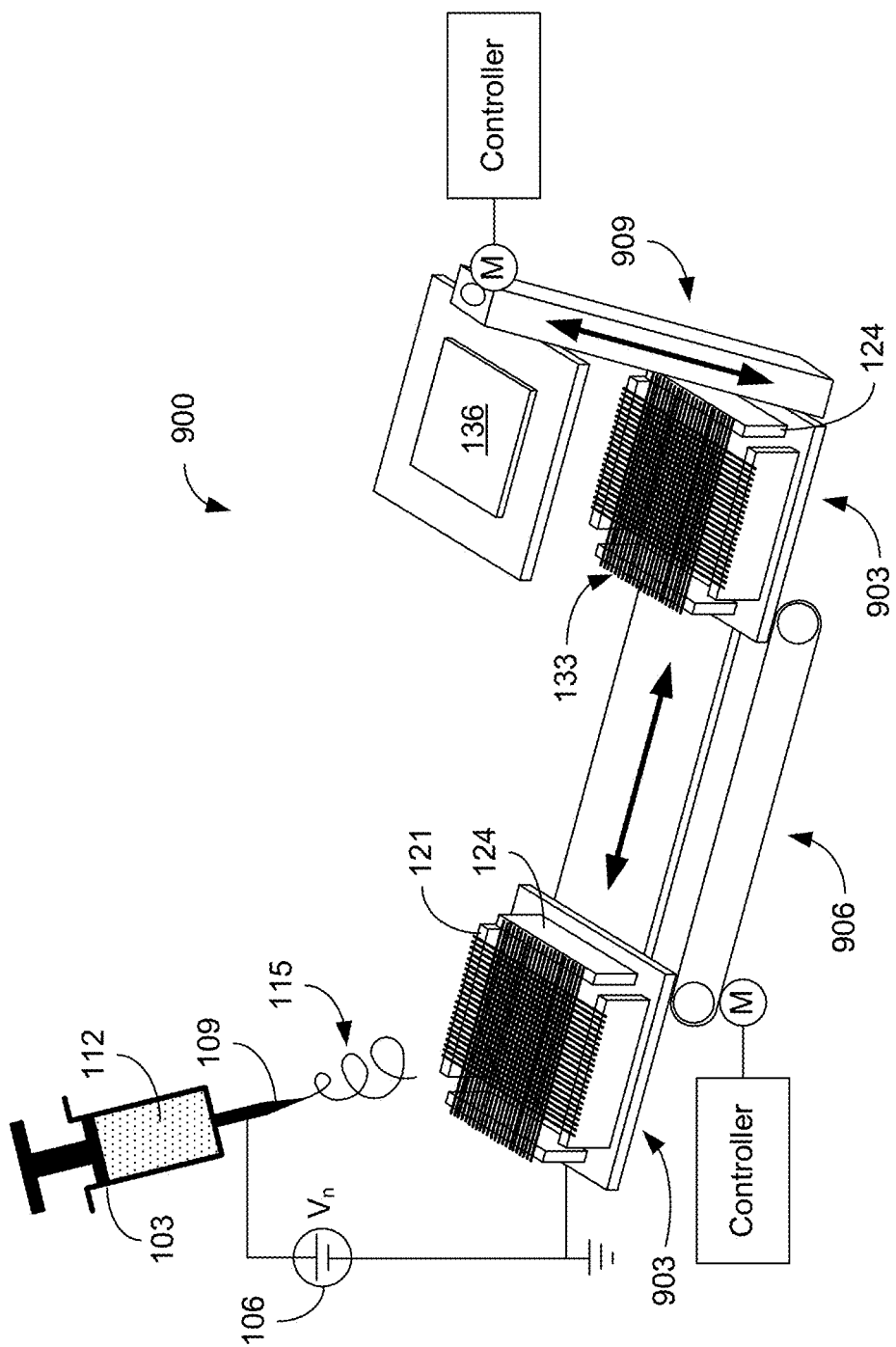

Referring to FIG. 9, shown is a graphical representation of an example of an electrospinning system 900 that integrates electrospinning of FIG. 1A and pattern transfer processes of FIGS. 1C and 1D using mechanical micro-molds to produce a non-lithographic patterned membrane 145 from a nanoporous membrane 133. In a first position, electrospinning is performed with the electrostatic alignment of nanofibers 115 to form the nanoporous membrane 133. For example, the nanoporous membrane 133 may be spun on an electrospinning assembly 903 including the electrodes 121 and 124, which may then be transported to a second position to form the patterned membrane 145. In the example of FIG. 9, a horizontal transport stage 906 may be used to move the electrospinning assembly 903 with the nanoporous membrane 133 into position with respect to a transferor 136 and mainmold 139 (not shown). The horizontal transport stage 906 may use, e.g., a belt, gear, or screw drive for positioning of the electrospinning assembly 903. In some implementations, the mainmold 139 may be included in the electrospinning assembly 903.

Once in position, stamp-thru-mold (STM) patterning of the nanoporous membrane 133 is used to form the patterned membrane 145 as illustrated in FIG. 1D. A vertical transport system 909 may be used to apply pressure to the transferor 136. The vertical transport system 909 may also be used to lift off the transferor 136 and mainmold 139 after forming the patterned membrane 145. The vertical transport stage 909 may use, e.g., a belt, gear, or screw drive for movement of the transferor 136 and/or mainmold 139. The horizontal and vertical transport stages 906 and 909 may be drive by, e.g., a stepper motor that is controlled by a controller such as, e.g., a microcontroller. In some implementations, control of the electrospinning and transport systems 906 and 909 may be controlled by a single controller.

Three dimensional (3-D) scaffolds or tower arrays may be produced with the ESTM system described above. Multiple layers of nanofibers (aligned or random) can be stacked layer by layer via the ESTM process to form a nanoporous tower array. For example, arrays with 20 or more layers may be produced. Each layer can be customized by selecting appropriate geometry controlled by nanofiber alignment and micropatterning, as well as by choosing appropriate materials including, e.g., polymers, carbon, and ceramics. By choosing appropriate materials such as, e.g., biodegradable polymers the structure may be allowed to change over time. In some implementations, structures such as, e.g., microelectrode arrays (MEA) and/or microfluidic channels may be integrated with or included between the nanofiber layers to form a more functionalized system offering electrical signaling and monitoring, stimulation functions, and/or environmental controls that may be useful. Complete access for fluidic control and electrical recording may be provided. For example, the electrospun fibers can be laid on top of a bed of micropillars allowing fluidic access to be provided to both the top and bottom of the tower array. By controlling choice of material and surface modification, highly customized systems can be created.

Figure 10:
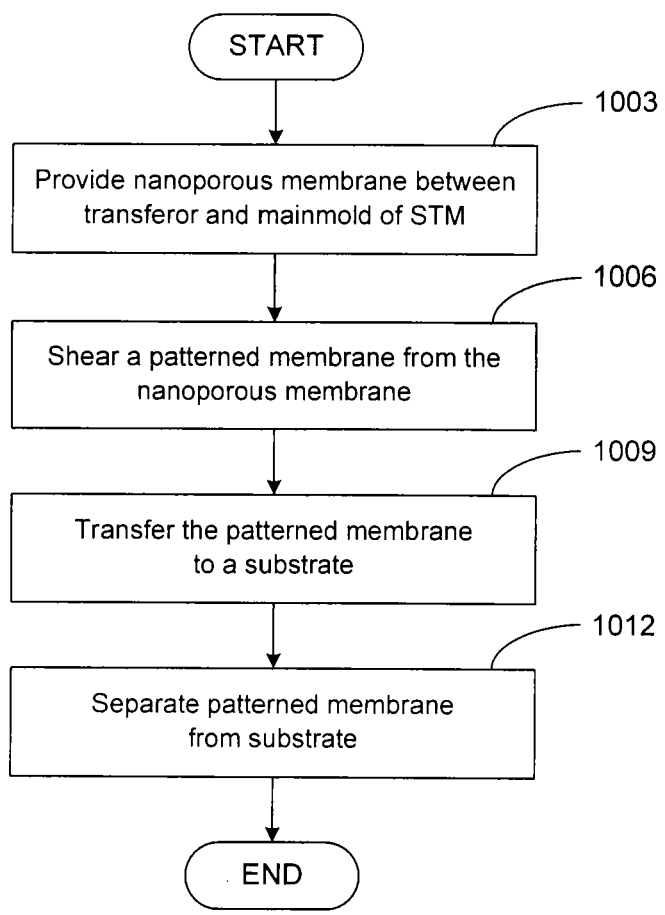
FIG. 10 is a flowchart illustrating the production of a patterned membrane using the ESTM system of FIGS. 1A, 1C, 1D and 9 in accordance with various embodiments of the present disclosure.

Referring next to FIG. 10, shown is a flowchart illustrating patterning of a nanoporous membrane 133 (FIG. 1A-1C). To begin, in block 1003 a nanoporous membrane 133 is provided between a transferor 136 (FIG. 1C) and a mainmold 139 (FIG. 1C) of a stamp-through-mold (STM). The nanoporous membrane 133 includes a plurality of nanofiber layers 130 (FIG. 1B). A first nanofiber layer 130 comprises a plurality of nanofibers that are approximately aligned in a first direction, and where a second nanofiber layer 130 adjacent to the first nanofiber layer 130 comprises a plurality of nanofibers that are approximately aligned in a second direction that is different than the first direction. The nanoporous membrane 133 may be transferred onto the mainmold 139 or may be formed directly over the mainmold 139 as described above. In some implementations, a nanoporous membrane 133 may be feed between the transferor 136 and the mainmold 139 of the STM. A patterned membrane 145 (FIG. 1C) is sheared from the nanoporous membrane 133 in block 1006 using, e.g., the transferor 136 and the mainmold 139 of the STM. In block 1009, the patterned membrane 145 is transferred to a substrate 142 (FIG. 1C). Pressure and temperature may be applied for a period of time to improve transfer of the patterned membrane 145 form the transferor 136 to the substrate 142. The patterned membrane 145 may then be separated from the substrate 142 in block 1012 for further application.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system, comprising:
   a plurality of electrode pairs, each electrode pair of the plurality of electrode pairs including a pair of substantially parallel electrodes;
   a controllable power supply configured to control electrical potentials applied to the plurality of electrode pairs;
   a syringe configured to eject an electrically charged solution from a needle to form a nanofiber, where orientation of the nanofiber in a nanofiber layer of a nanoporous membrane is determined by the electrical potentials of the plurality of electrode pairs; and
   a stamp-thru-mold (STM) including a transferor and a mainmold, the STM configured to shear the nanoporous membrane positioned between the transferor and the mainmold.

2. The system of claim 1, wherein the syringe is configured to form a plurality of nanofibers to form the nanofiber layer, wherein the plurality of nanofibers are approximately aligned with each other.

3. The system of claim 1, wherein the mainmold is positioned between the plurality of electrode pairs.

4. The system of claim 1, further comprising a substrate, wherein a patterned portion of the nanoporous membrane is transferred onto the substrate after shearing.

5. The system of claim 1, wherein the STM further includes a motor-driven mechanism configured to apply a shearing force to the transferor.

6. The system of claim 1, further comprising a voltage supply coupled to the needle of the syringe to electrically charge the electrically charged solution.

7. The system of claim 1, wherein the plurality of electrode pairs includes a first electrode pair and a second electrode pair, where the first electrode pair is substantially perpendicular to the second electrode pair.

8. The system of claim 7, wherein the controllable power supply is a reversible power supply connected to the first and second electrode pairs, the reversible power supply configured to alternate the electrical potentials applied to the first and second electrode pairs.

9. The system of claim 8, wherein the nanoporous membrane includes a plurality of nanofiber layers, each nanofiber layer including approximately aligned nanofibers, where the nanofibers of adjacent nanofiber layers are approximately orthogonal.

10. A method, comprising:
providing a nanoporous membrane between a transferor and a mainmold of a stamp-through-mold (STM), the nanoporous membrane including a plurality of nanofiber layers, where a first nanofiber layer of the plurality of nanofiber layers comprises a plurality of nanofibers that are approximately aligned in a first direction, and where a second nanofiber layer of the plurality of nanofiber layers is adjacent to the first nanofiber layer and comprises a plurality of nanofibers that are approximately aligned in a second direction that is different than the first direction;
shearing a patterned membrane from the nanoporous membrane using the transferor and the mainmold of the STM; and
transferring the patterned membrane to a substrate.

11. The method of claim 10, wherein providing the nanoporous membrane comprises:
forming the first nanofiber layer over the mainmold of the STM; and
forming the second nanofiber layer over the first nanofiber layer.

12. The method of claim 11, wherein the plurality of nanofibers of the first nanofiber layer are approximately orthogonal to the plurality of nanofibers of the second nanofiber layer.

13. The method of claim 11, wherein providing the nanoporous membrane further comprises forming a third nanofiber layer of the plurality of nanofiber layers over the second nanofiber layer, where the third nanofiber layer comprises a plurality of nanofibers that are approximately aligned in a direction that is different than the second direction.

14. The method of claim 13, wherein the plurality of nanofibers of the first nanofiber layer are approximately aligned with the plurality of nanofibers of the third nanofiber layer.

15. The method of claim 11, wherein forming the first nanofiber layer or the second nanofiber layer comprises:
ejecting an electrically charged solution from a needle to form a nanofiber; and
applying an electrical potential to a first pair of substantially parallel electrodes positioned on opposite sides of the mainmold of the STM to approximately align the nanofiber with other nanofibers in the first or second nanofiber layer.

16. The method of claim 15, wherein forming the first nanofiber layer or the second nanofiber layer further comprises simultaneously grounding a second pair of substantially parallel electrodes positioned on opposite sides of the mainmold to approximately align the nanofiber with the other nanofibers.

17. The method of claim 16, wherein the second pair of substantially parallel electrodes is substantially orthogonal to the first pair of substantially parallel electrodes.

18. The method of claim 10, further comprising heating the patterned membrane to bond the plurality of nanofiber layers.

19. The method of claim 10, further comprising separating the patterned membrane from the substrate.

20. A method, comprising:
forming a nanoporous membrane by controlling alignment of nanofibers deposited in a nanofiber layer of the nanoporous membrane;
positioning the nanoporous membrane between a transferor and a mainmold of a stamp-through-mold (STM); and
shearing a patterned membrane from the nanoporous membrane using the transferor and the mainmold of the STM.

* * * * *